United States Patent [19]

Goodzeit et al.

[11] Patent Number: 5,608,634

[45] Date of Patent: Mar. 4, 1997

[54] LOW NOISE SPACECRAFT BODY RATE SENSING ARRANGEMENT FOR ATTITUDE CONTROL

[75] Inventors: Neil E. Goodzeit, East Windsor; Michael A. Paluszek, Lawrenceville, both of N.J.

[73] Assignee: Martin Marietta Corp., East Windsor, N.J.

[21] Appl. No.: 897,489

[22] Filed: Jun. 12, 1992

[51] Int. Cl.$^6$ .................................................. G06F 19/00
[52] U.S. Cl. .............................. 364/424.013; 364/457; 364/455; 364/439; 244/164; 244/165; 244/171; 244/162
[58] Field of Search ........................ 364/434, 455, 364/459, 439, 162, 157, 176, 183; 244/164, 165, 166, 169, 170, 171, 3.2, 3.22; 60/662

[56] References Cited

U.S. PATENT DOCUMENTS

| | | | |
|---|---|---|---|
| 4,062,509 | 12/1977 | Muhlfelder et al. | 244/166 |
| 4,294,420 | 10/1981 | Broquet | 244/165 |
| 4,556,956 | 12/1985 | Dickenson et al. | 364/162 |
| 4,758,957 | 7/1988 | Hubert et al. | 364/434 |
| 4,931,942 | 6/1990 | Garg et al. | 364/459 |
| 4,960,250 | 10/1990 | Schmidt | 244/164 |
| 5,025,381 | 6/1991 | Goodzeit et al. | 364/434 |
| 5,047,945 | 10/1991 | Paluszek | 364/434 |
| 5,058,835 | 10/1991 | Goodzeit et al. | 244/165 |
| 5,107,434 | 4/1992 | Paluszek | 364/455 |
| 5,140,525 | 8/1992 | Shankar et al. | 364/459 |
| 5,205,518 | 4/1993 | Stetson, Jr. | 244/165 |

*Primary Examiner*—Kevin J. Teska
*Assistant Examiner*—Jacques H. Louis-Jacques
*Attorney, Agent, or Firm*—W. H. Meise; C. A. Berard; S. A. Young

[57] ABSTRACT

A spacecraft is controlled by a composite attitude signal including two components with different passbands. In one embodiment, a spacecraft attitude control system includes an attitude sensor and a controller which provides a time derivative function. High frequency noise components of the sensed attitude signal are enhanced by the derivative, and tend to cause attitude jitter or excess power consumption. The jitter is reduced by low pass filtration of the sensor signal, but this undesirably reduces the high frequency response of the attitude sensor. The high frequency response is restored by high pass filter coupled to a reaction or momentum wheel tachometer, which produces a signal representative of the high frequency components of the body rate. A summing circuit couples together the filtered attitude sensor signals with the high frequency components of the wheel speed signal to produce a relatively noise free broadband body rate signal. In another embodiment, the spacecraft estimates the attitude, and the estimated attitude either lacks high-frequency components, or they are noisy. The missing or noisy high-frequency components are replaced by high frequency components derived from a wheel.

18 Claims, 5 Drawing Sheets

LOW NOISE SPACECRAFT BODY RATE SENSING ARRANGEMENT FOR ATTITUDE CONTROL

The Government has rights in this invention under Contract No. F04701-89-C-0073 with the Air Force.

BACKGROUND OF THE INVENTION

This invention relates to attitude control systems for spacecraft, and more particularly to systems which reduce attitude jitter.

FIG. 1 is a simplified block diagram of a spacecraft, designated generally as 10, orbiting about a heavenly body 12, which may be Earth. Spacecraft 10 includes a body 14 oriented relative to roll, pitch and yaw axes 16, 18, and 20, respectively. Yaw axis 20 is directed toward earth, roll axis 16 points in the orbital direction, and pitch axis 18 is normal to the orbital plane. Satellite body 14 supports solar panels 22a and 22b as known for producing electrical energy for powering spacecraft attitude control systems and the electrical portions (not illustrated) of housekeeping systems, torquers such as magnetic torquers and arc jet thrusters, if used, and for the payload. An earth sensing arrangement (ESA) illustrated as 24 is mounted on spacecraft body 14 for producing signals representative of the roll and/or pitch attitude of body 14. A sun sensor illustrated as 44 produces yaw-representative signals at certain times of day, as is well known in the art.

FIG. 2 is a simplified block diagram of a prior art attitude control arrangement usable in the satellite of FIG. 1. Elements of FIG. 2 corresponding to those of FIG. 1 are designated by like reference numerals. In FIG. 2, earth sensor assembly 24 produces roll and attitude signals which are applied to the inverting (−) input ports of roll and pitch, respectively, summing circuits 30 and 32. Noninverting (+) input ports of summing circuits 30 and 32 are coupled to receive roll and pitch, respectively, attitude commands from a source of attitude commands illustrated as a block 34. As known, block 34 may include a memory in which commands are stored for application at predetermined times, and may include a communication channel by which the stored attitude command information may be updated. Summing circuits 30 and 32 subtract the sensed attitude from the commanded attitude to produce roll and pitch error signals, respectively, which are applied to proportional-derivative (PD) wheel controllers 36 and 38, respectively. The roll and pitch attitude signals produced by ESA 24 are also applied to differentiating (d/dt) blocks 26 and 28, respectively. The differentiated signals produced at the outputs of blocks 26 and 28 represent roll and pitch rates, respectively. The roll and pitch rate signals generated at the outputs of differentiating blocks 26 and 28, respectively, are applied to proportional-derivative wheel controllers 36 and 38, respectively. Proportional-derivative controllers 36 and 38 each calculate a linear combination of proportional and derivative signals, and more particularly, PD controller 36 multiplies roll attitude rate from block 26 by a roll attitude rate gain, multiplies roll attitude error from block 30 by a roll position gain, and sums together the two products to produce roll torque command signals for driving a roll wheel drive circuit 40a for control of a roll wheel represented by block 40b. PD controller 38 multiplies pitch attitude rate from block 28 by a pitch attitude rate gain, multiplies pitch attitude error from summing circuit 32 by a pitch position gain, and sums together the two products to produce pitch torque command signals for driving a pitch wheel drive circuit 42a for control of a pitch wheel represented by a block 42b.

A sun sensor illustrated as a block 44 in FIG. 2 at least periodically produces signals representative of the spacecraft yaw attitude. The yaw attitude signals are applied to the inverting input of a summing circuit 48, in which the sensed yaw attitude is subtracted from the commanded yaw attitude produced in block 34, to produce a yaw attitude error signal for application to a yaw proportional-derivative controller 50. The yaw attitude signals from sun sensor 44 are also applied to a differentiator 46 to produce yaw rate signals, which are applied as a second input to PD controller 50. Controller 50 sums together the yaw attitude error and the yaw rate to produce torque command signals for application to a yaw wheel drive 52a and to a yaw wheel 52. The axis of rotation of wheel 52b is at least parallel to yaw axis 20 of FIG. 1.

Those persons skilled in the art to which the invention pertains will recognize that, if the roll, pitch or yaw wheels, or any of them are skewed relative to the spacecraft axes, the commanded torques must be distributed among the wheels to achieve the desired attitude control about a particular axis.

The signals produced by the ESA and the sun sensor may be noisy, either because of actual noise inherent in the sensor, or because of poor viewing angle, or possibly because of unwanted objects in the field of view, and also can be noisy because of poor resolution attributable to an insufficient number of quantizing levels. The differentiation or time derivative of the noisy signal in the differentiators 26, 28 and/or 46 amplifies high frequency noise. The amplified high frequency noise becomes part of the control signal driving the wheel.

FIG. 3a illustrates a torque-amplitude vs. time plot 310 for the prior art arrangement of FIG. 2. As illustrated, substantial torque variations occur, even in regions in which the attitude error is essentially constant. The peak-to-peak excursions of the torque are about 0.4 inch-pounds (in-lbs). These large, high frequency torque components represent energy applied to the wheels. As a result, electrical energy is consumed by the wheels without producing a net error correction, the wheels are subjected to continuous forces, thereby tending to wear their bearings. If chemical thrusters are used instead of wheels, propellant is wasted by the frequent operation of the thrusters. The frequent torquing by use of wheels or thrusters necessarily results in pointing jitter.

One possible solution to the problem of jitter in the arrangement of FIG. 2 is to use improved, low noise or high resolution sensors, or to provide a long-life gyroscope for use during slewing maneuvers. However, space-qualified high-resolution sensors and gyroscopes are extremely expensive, and may be prohibitively so for commercial spacecraft.

Another possible solution would be to low pass filter the sensor signal in the arrangement of FIG. 2, to thereby reject high-frequency sensor components. However, this has a major disadvantage. If the pointing of the spacecraft is to be changed, as might be the case if it were desired to direct a sensing instrument toward a different part of the earth, or a telescope toward a different part of the sky, a step command would be generated by attitude command block 34 and applied to one or more of summing circuits 30, 32 and 48. This would initiate a fast slew toward the new attitude as the wheels were torqued. However, the filtered sensor signals could not produce high frequency sensed attitude signals, whereby the sensed attitude signals would lag the actual attitude. Consequently, the actual attitude of the spacecraft would overshoot the commanded attitude, and "hunt" toward the commanded attitude. Depending upon the damping of the system, this might or might not converge, but in any case is time-consuming and expends more fuel or electrical energy than is necessary to accomplish the desired attitude change.

SUMMARY OF THE INVENTION

In accordance with the invention, a spacecraft which uses reaction or momentum wheels, and in which wheel speed signals are available, makes use of the wheel speed signals as another source of body rate information. This may be understood by considering that, in the absence of any external attitude perturbation influences, body angular momentum is equal and opposite to wheel angular momentum. The body typically has much greater inertia than the wheel. For example, one spacecraft has a body inertia of 14,000 in-lb-sec$^2$ and the wheel has a inertia of 0.3 in-lb-sec$^2$. Thus, large wheel speed changes are required to produce even small changes in body angular rate. However, the existence of external attitude perturbation influences affects the above-mentioned relationship. The invention is based upon the realization that the external influences on the spacecraft body have relatively small high-frequency components. Consequently, while the low-frequency components of the wheel speed are not representative of the body rate, the high frequency components of the wheel speed accurately represent the body rate. Thus, the high frequency components of the attitude sensor signal are discarded, and the high frequency components of the wheel speed signal are substituted therefor to produce a low noise combined body rate signals.

DESCRIPTION OF THE INVENTION

Figure 2:
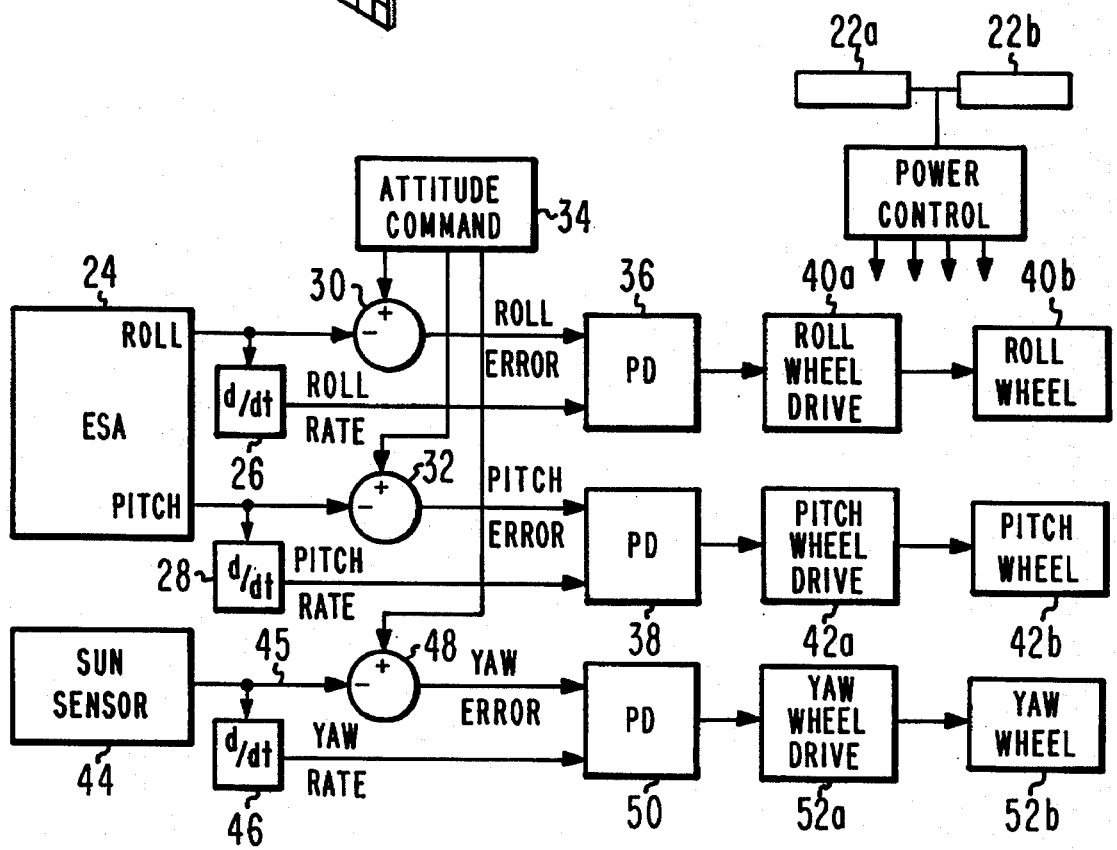
FIG. 2 is a simplified block diagram of an attitude control system which may be used in the arrangement of FIG. 1, for describing how torque jitter may arise.
Figure 4A:
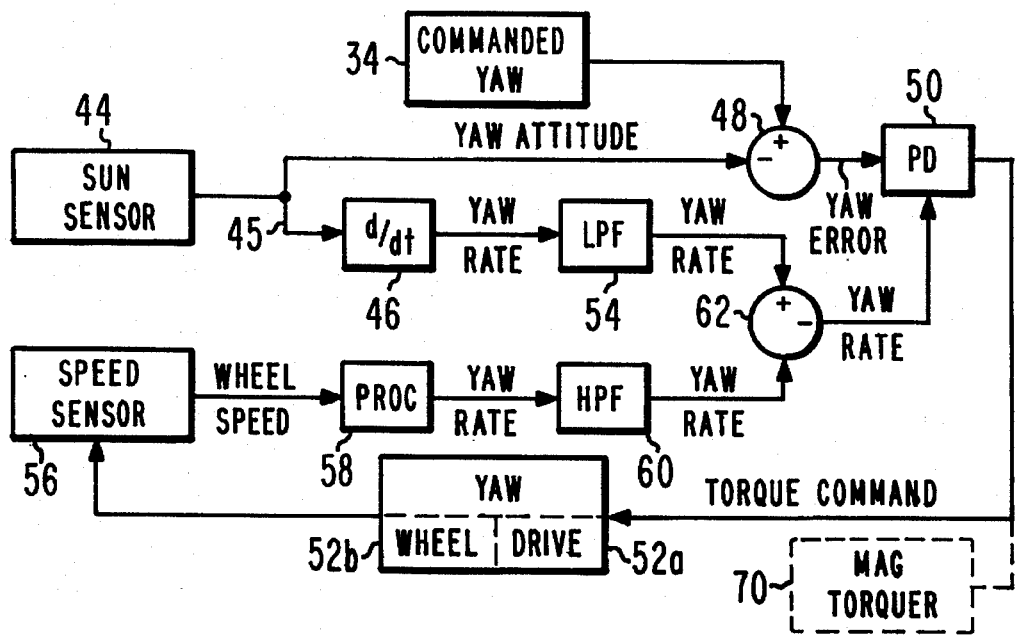
FIGS. 4a, 4b and 4c are simplified block diagrams of one axis of control in accordance with different embodiments of the invention.

FIG. 4a illustrates one channel of control in accordance with the invention. As illustrated in FIG. 4a, the channel is the yaw channel. In FIG. 4a, elements corresponding to those of FIG. 2 are designated by like reference numerals. In FIG. 4a, the differentiated sun sensor signal or yaw rate signal at the output of differentiator block 46 is applied to a low pass filter (LPF) block 54, and the resulting low-frequency. components of the sun sensor yaw rate signal are applied to a non-inverting input port of a summing circuit 62. A speed sensor 56 associated with yaw wheel 52 produces tachometer or wheel speed signals, which are applied to a processing block 58 for converting the speed signals into body yaw rate signals. This conversion is accomplished by multiplying the speed signals by the ratio of the yaw wheel inertia divided by the spacecraft body inertia about the yaw axis. These body rate signals, as mentioned, have a relatively low noise, and accurately represent the high-frequency components of the body rate. The body rate representative signals produced at the output of processor 58 are applied to a second non-inverting input port of summing circuit 62 through a high pass filter (HPF) 60. The characteristics of high pass filter 60 and low pass filter 54 are preferably mutually complementary, as described below. Summing circuit 62 sums together the low frequency, relatively noise free components from sun sensor 44 and the high frequency, relatively noise free signals originating from speed sensor 56 to produce a low-noise combined yaw body rate signal which is applied to PD controller 50. The remainder of the yaw loop of FIG. 4a corresponds to that of FIG. 2. Naturally, the pitch and roll loops of FIG. 2 may also be arranged as in FIG. 4a, substituting the appropriate outputs of ESA 24 for the output of the sun sensor, and using a tachometer associated with the corresponding wheel.

Figure 4B:
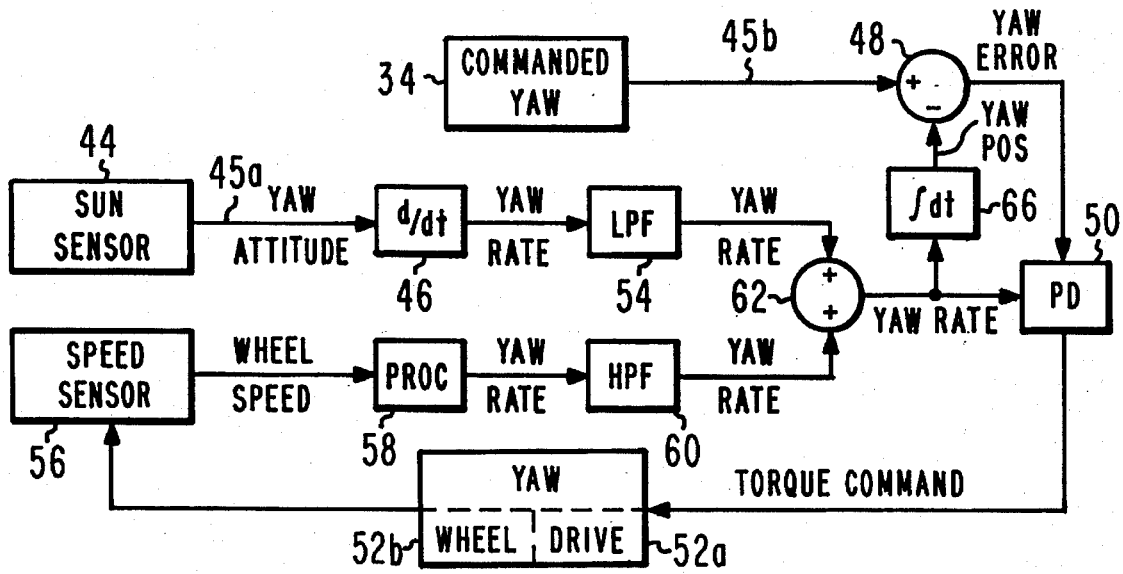

The embodiment of FIG. 4b is similar to that of FIG. 4a, and corresponding elements are identified by the same reference numerals. In FIG. 4b, the yaw attitude for application to the inverting input port of summing circuit 48 is derived from the combined yaw rate signal produced at the output port of summing circuit 62, by a time integrator illustrated as a block 66, rather than being taken directly from sun sensor 44 as in FIG. 4a.

Figure 4C:
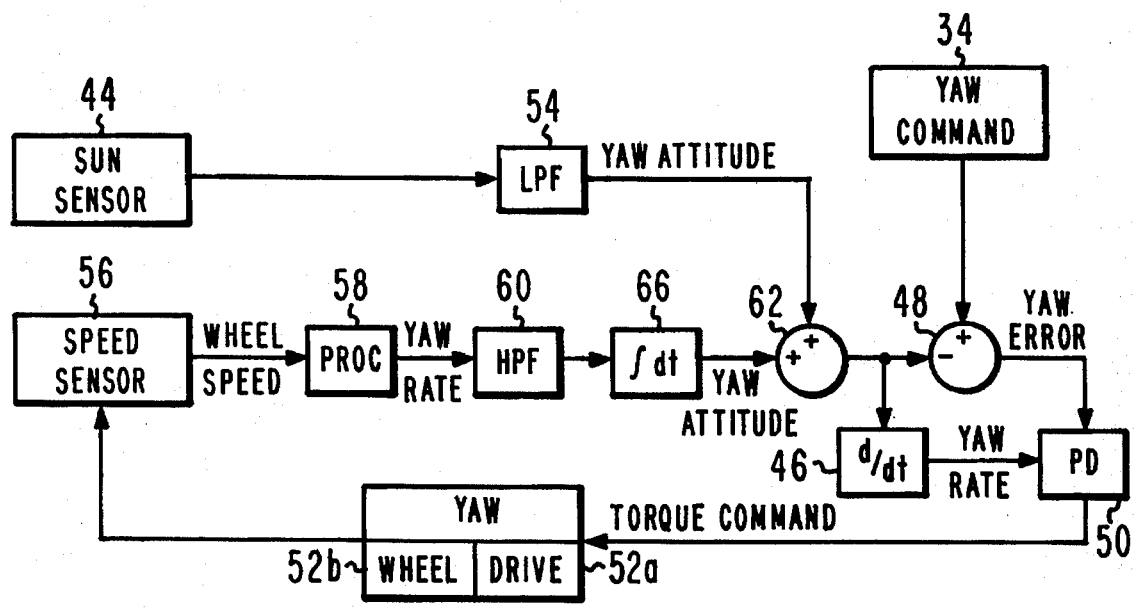

The embodiment of FIG. 4c is similar to those of FIGS. 4a and 4b, and corresponding elements are identified by the same reference numerals. In FIG. 4c, the inputs to summing circuit 62 are low frequency components of yaw attitude originating from sun sensor 44, and high frequency components originating from speed sensor 56, converted to yaw rate by processor 58, and to yaw attitude by integrator 66. The combined yaw attitude at the output of summing circuit 62 is applied to the inverting input of summing circuit 48 for producing yaw error, and to a differentiating circuit 46 for producing yaw rate.

Figure 5A:
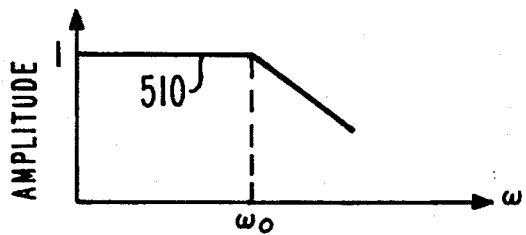
FIGS. 5a and 5b are idealized plots of relative amplitude versus log frequency, representing the frequency response of portions of FIG. 4 in a preferred embodiment of the invention.
Figure 5B:
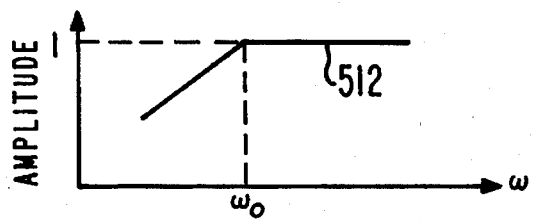

FIGS. 5a and 5b represent the amplitude-versus-frequency response of low pass filter 54 and high pass filter 60 of FIG. 4a, respectively. In FIG. 5a, plot 510 has a constant amplitude normalized to a value of unity in a frequency range extending from zero frequency to a frequency $\omega_0$, and rolls off (progressively decreases in amplitude) above $\omega_0$. Plot 512 of FIG. 5b has a constant amplitude normalized to unity at frequencies above $\omega_0$, and a rising characteristic at frequencies between 0 and $\omega_0$. Desirably, the roll-off rate of plot 510, measured in db per octave, equals the rate of rise of plot 512.

Figure 3A:
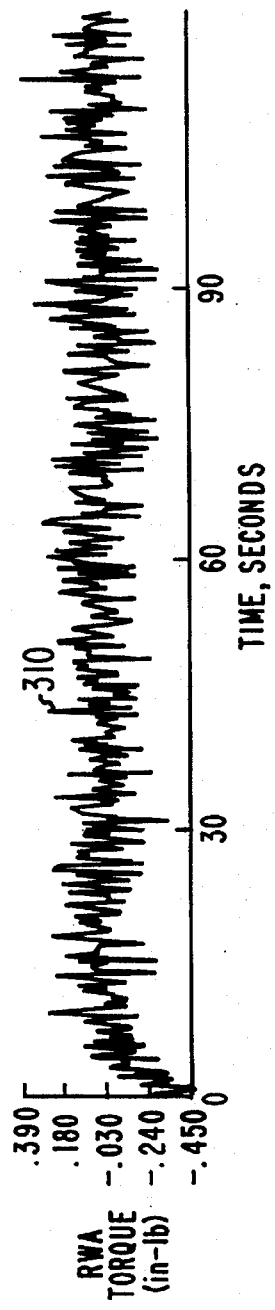
FIGS. 3a and 3b are computer-generated plots of reaction wheel assembly torque and attitude error, respectively, along one axis, for a system such as that of FIGS. 1 and 2.
Figure 3B:
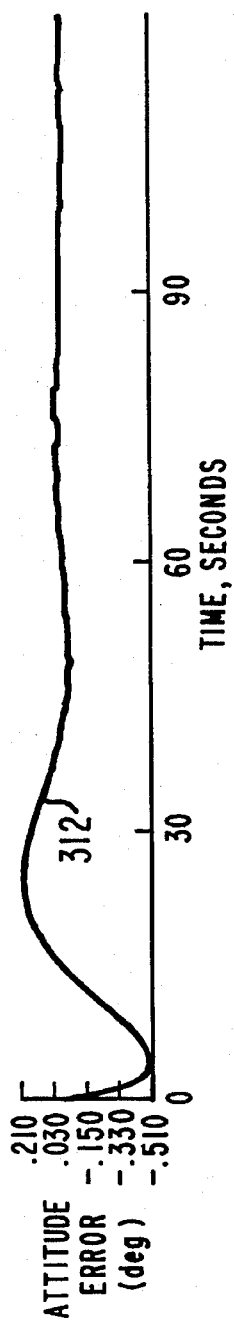
Figure 6A:
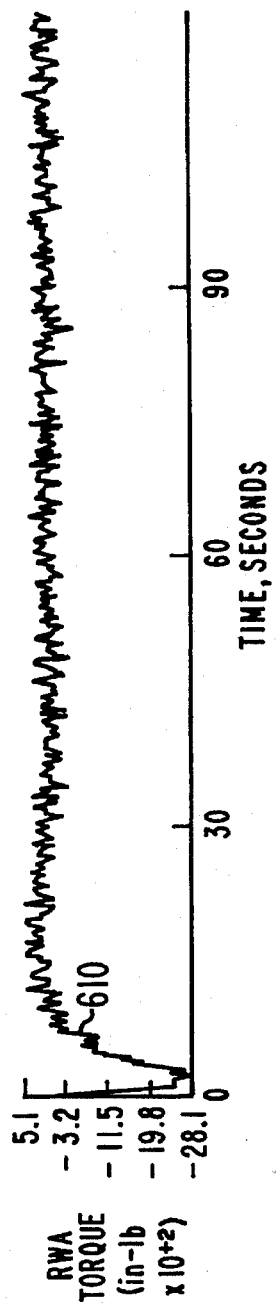
FIGS. 6a and 6b are computer-generated plots of reaction wheel assembly torque and attitude error, respectively, for a system such as that of FIG. 4.
Figure 6B:
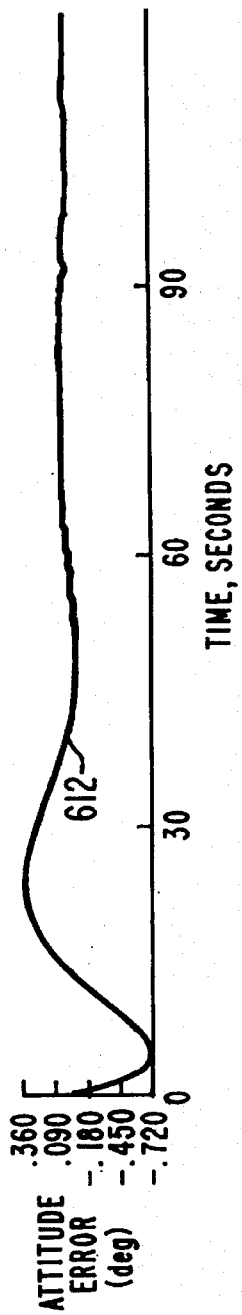

Plot 610 of FIG. 6a represents reaction wheel assembly (RWA) torque for the arrangement of FIG. 4. As illustrated in FIG. 6a, the high-frequency peak-to-peak excursions of torque are less than 0.08 in-lb, which is an improvement by a factor somewhat greater than 5:1, compared the plot 310 of FIG. 3a. The attitude error represented by plot 612 of FIG. 6b has an initial transient response which is similar to that of plot 312 of FIG. 3b, indicating a relatively small effect on system stability.

Figure 1:
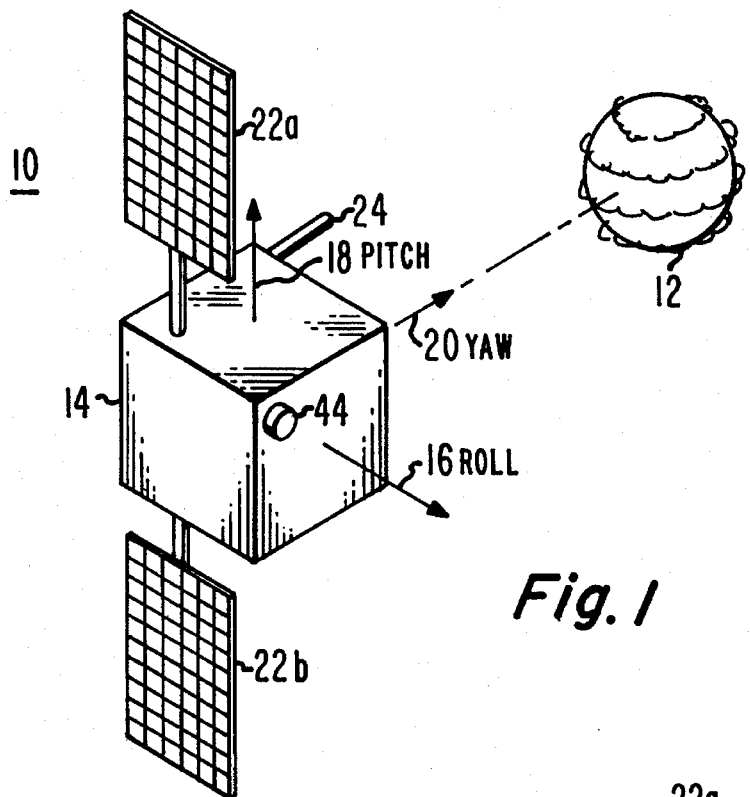
FIG. 1 is a simplified perspective or isometric view of a satellite with which the invention may be used.
Figure 7:
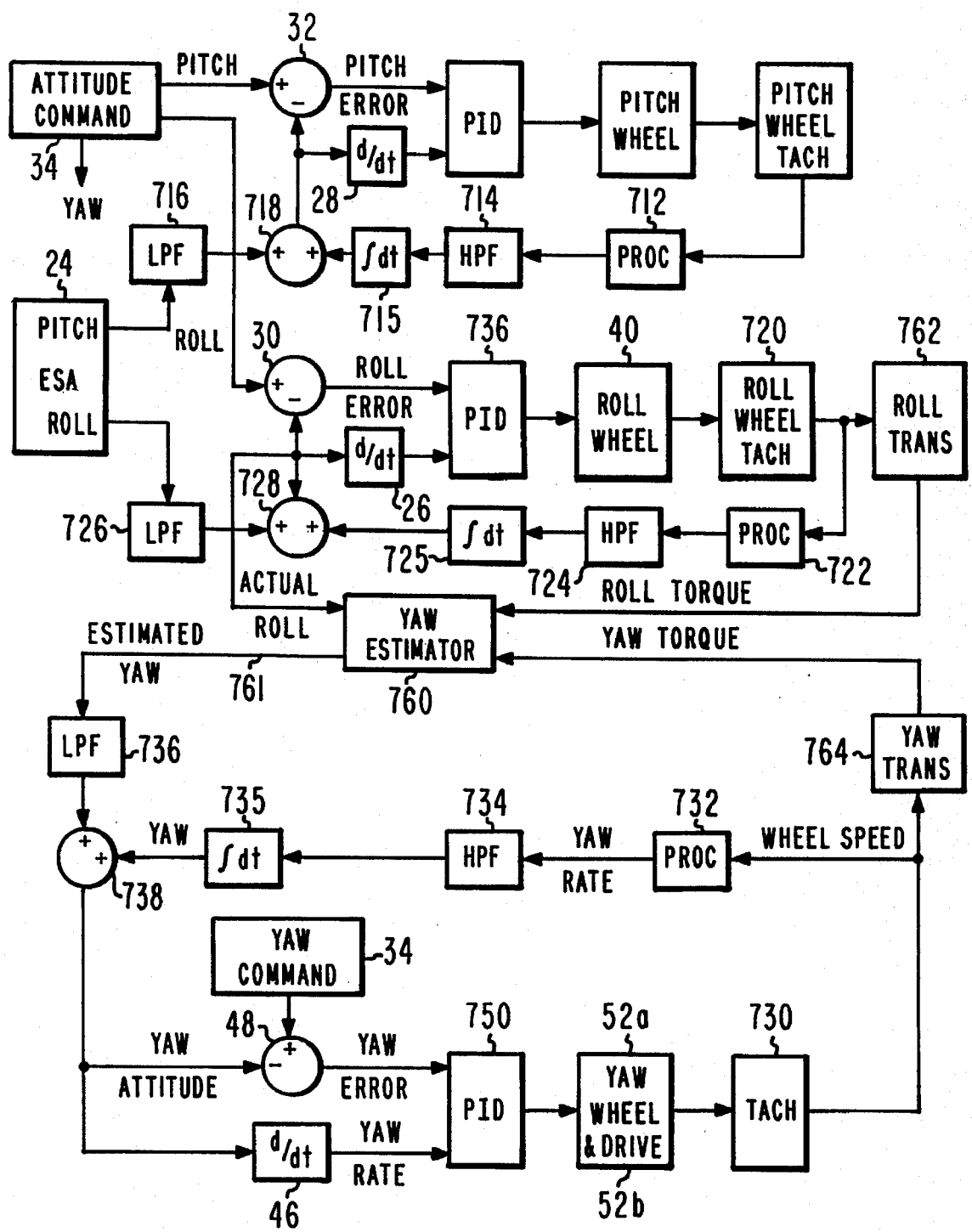
FIG. 7 is a simplified block diagram of another embodiment of the invention in which the yaw signal is provided by an estimator rather than a sensor, and high frequency components of yaw are provided by a wheel.

The invention may also be used to supplement or enhance the attitude derived from an attitude estimator, where the attitude estimate lacks high-frequency components because of the processing used to produce the estimate. FIG. 7 is a simplified block diagram of an attitude control system in which the yaw is controlled using an estimator, and in which the invention is used on all three axes. Elements of FIG. 7 corresponding to those of FIG. 1 are designated by like reference numerals.

In FIG. 7, ESA 24 produces actual pitch signals, which are applied by way of an LPF 716 to a noninverting input of a summing circuit 718, where the low-frequency components of pitch from LPF 716 are summed with the integrated output of an integrator 715. Integrator 715 receives high-frequency components of pitch rate signal from a high-pass filter (HPF) 714, which is complementary to LPF 716. The resulting sum signals at the output of summing circuit 718 includes low-frequency pitch signal components from ESA 24 and low-noise high-frequency components ultimately derived from pitch wheel 42. The composite pitch signal produced by summing circuit 718 is applied to the inverting input of a summing circuit 32 for subtraction from the commanded pitch, and is also applied to differentiating circuit 28. The pitch error and pitch rate signals produced by summing circuit 32 and differentiator 28 are applied to a proportional-integral-derivative controller illustrated as a block 738, in which the pitch error, the pitch rate, and an integrated pitch error signal are summed to produce a pitch torque command signal. The pitch torque command signal is applied to pitch wheel 42. A tachometer 710 coupled to pitch wheel 42 produces wheel speed signals, which are used for other known purposes, and which are also applied to a processing circuit 712 for producing pitch rate signals for application to HPF 714.

The arrangement for roll control in FIG. 7 is similar to that for pitch control. The roll attitude signal from ESA 24 has its noisy high-frequency portion removed by LPF 726, and the LP filtered roll attitude signal is combined in a summing circuit 728 with integrated, relatively noise-free high-frequency components of roll rate from complementary HPF 724 and integrator 725. The resulting composite roll attitude signal is applied from summing circuit 728 to the inverting input of summing circuit 30, where it is subtracted from the commanded roll attitude to produce roll attitude error, and it is also applied to the differentiator 26 for producing roll rate signals. The roll attitude error signals and roll rate signals from summing circuit 30 and differentiator 26, respectively, are applied to a PID controller 736, where the roll attitude error signals and the roll rate signals are combined with a signal representing the integral of roll error to produce torque command signals. The torque command signals are applied to roll wheel 40. Roll tachometer (tach) 720 produces roll wheel speeds and applies them to a processor 722 for producing signals representative of roll attitude, for application to HPF 724. As so far described, the roll control system is similar to the pitch control system. The signals from roll wheel tach 720 are applied to a roll translation circuit 762, in which the roll wheel speed is translated into a corresponding roll torque signal, which is applied to a yaw estimator illustrated as a block 760. The composite roll signal produced at the output of summing circuit 728 is also applied to yaw estimator 760.

Yaw estimators are used to provide continuous estimates of yaw attitude in spacecraft in which yaw cannot be directly sensed at all times. The yaw estimates may be updated periodically with actual sensed yaw, if desired. The type of estimator is not particularly important. The salient characteristic of many attitude estimators is that they produce long-term estimates rather than short-term estimates, which is another way of saying that they are heavily filtered. It is also possible for a yaw estimator to form the yaw estimate using roll error, taking the difference between a heavily filtered roll attitude estimate and the sensed roll attitude, which in the presence of sensor noise results in very large noise components in the resulting roll error signal. These large noise components of roll error can undesirably perturb the estimated yaw. For definiteness, yaw estimator 760 of FIG. 7 is assumed to be the estimator described in U.S. patent application Ser. No. 07/799,477, filed Nov. 25, 1991 in the name of Stetson, but any other yaw estimator may be used. Yaw estimator 760 receives actual roll, roll torque and yaw torque signals, and produces a filtered yaw estimate on a data path 761. The estimated yaw is applied to a LPF filter 736, if noisy components of estimated yaw are present. The low-frequency components of estimated yaw are applied to a noninverting input port of a summing circuit 738, where they are summed with high-frequency components of yaw attitude generated as described below. The resulting composite of estimated low frequency yaw attitude with actual high-frequency yaw attitude is applied from summing circuit 738 to differentiator 46, and to the inverting input of summing circuit 48. Summing circuit 48 subtracts the composite yaw attitude signal from the commanded yaw to produce a yaw error signal. The yaw error signal is applied to a PID controller 750 together with the differentiated composite attitude signal from differentiator 46. PID controller 750 sums the differentiated signal and the yaw error signal with an integrated yaw error signal to produce a torque command signal. The torque command signal is applied to yaw wheel 52 to correct the yaw attitude. The torquing of the yaw wheel produces a torque. The signal from tachometer 730 is applied to a yaw translating circuit illustrated as a block 764, in which the change in speed is translated into the corresponding yaw torque, and that signal is applied to yaw estimator 760. The tachometer signal is also applied to a processor 732, which produces signals representative of yaw rate. The high-frequency components of the yaw rate signals produced by processor 732 are representative of the actual yaw rate of the spacecraft. These signals are selected by HPF 734 integrated in integrator 735 to produce yaw, and the yaw signals are applied to summing circuit 738.

High Pass Filter 734 is desirably complementary to LPF 736, if present. If there is an absence of high-frequency components of yaw from estimator 760 because of filtration, HPF 734 is desirably complementary to the filter in estimator 760.

Other embodiments of the invention will be apparent to those skilled in the art. For example, torquing may be accomplished by any means which does not provide high frequency torque components, such as magnetic torquing, and the high frequency components of the wheel speed should still be usable as an indicator of the body rate. The complementary filters along the three axes need not have the same crossover frequencies, as the desirable frequencies will be determined by the noise characteristics and/or the high frequency content of the sensors or estimators. While integrators have been described, pseudointegrators (having a transfer function over a limited frequency range) may be used.

What is claimed is:

1. A spacecraft attitude control system, comprising:

a wheel mounted to said body, said wheel defining an axis of rotation;

wheel speed sensing means coupled to said wheel, for generating wheel speed signals;

torquing means mounted to said body, for controllably applying torque to said body about said axis in response to torque command signals:

attitude determining means coupled to said body for generating determined attitude signals;

control means coupled to said torquing means, and for receiving coupled attitude position signals and coupled attitude rate signals, for comparing said coupled attitude position signals with commanded attitude position signals to generate attitude error signals, and for combining said attitude error signals with said coupled attitude rate signals for generating said torque command signals;

coupling means coupled to said attitude determining means, to said control means, and to said wheel speed sensing means, for processing said wheel speed signals to produce wheel-derived signals related to one of attitude position and attitude rate, and for combining portions of said wheel-derived signals lying above a particular frequency with portions of said determined attitude signals lying below said particular frequency to generate one of said coupled attitude position and coupled attitude rate signals, and for generating the other one of said coupled attitude position and coupled attitude rate signals from one of said determined attitude signals and said one of said coupled attitude position and said coupled attitude rate signals.

2. A system according to claim 1, wherein said control means comprises:

first summing means including inverting and noninverting input ports, said noninverting input port being coupled for receiving commanded attitude position signals, and said inverting input port being coupled for receiving said coupled attitude position signals, for generating attitude error signals: and means for summing said attitude error signals with said coupled attitude rate signals for generating said torque command signals.

3. A system according to claim 2, wherein:

said attitude determining means comprises attitude sensing means for generating at least one form of said determined attitude signals.

4. A system according to claim 3, wherein said coupling means comprises:

processing means coupled to said wheel speed sensing means for multiplying said wheel speed signals by a signal representing the ratio of the inertia of said wheel about said axis to the inertia of said body about said axis, whereby said wheel-derived signal represents attitude rate.

5. A system according to claim 4, wherein said coupling means further comprises;

differentiating means coupled to said attitude sensing means for generating at least a second form of said determined attitude signals;

second summing means including first and second noninverting input ports;

low-pass filter means cascaded with said differentiating means for selecting portions of said second form of said determined attitude signals lying below said particular frequency, for applying said selected portions of said second form of said determined attitude signals to said first input port of said second summing means;

high-pass filter means cascaded with said processing means for selecting portions of said wheel-derived attitude rate signal lying above said particular frequency, for applying said selected portions of said wheel-derived attitude rate signal to said second input port of said second summing means, whereby said second summing means produces said coupled attitude rate signals in the form of combined coupled attitude rate signals.

6. A system according to claim 5, wherein said coupling means further comprises a coupling path coupled to said attitude sensing means and to said inverting input port of said first summing means for coupling said first form of said determined attitude signals to said inverting input port of said first summing means.

7. A system according to claim 5, wherein said coupling means further comprises integrating means coupled to said second summing means and to said inverting input port of said first summing means for integrating said combined coupled attitude rate signals for generating said coupled attitude position signals.

8. A system according to claim 3, wherein said coupling means further comprises;

processing means coupled to said wheel speed sensing means for at least integrating said wheel speed signals, whereby said wheel-derived signal represents attitude position.

9. A system according to claim 8, wherein said coupling means further comprises:

low-pass filter means coupled to said attitude determining means for selecting portions of said first form of said determined attitude signals lying below said particular frequency, for applying said selected portions of said first form of said determined attitude signals to said first input port of said second summing means;

high-pass filter means cascaded with said processing means for selecting portions of said wheel-derived signal lying above said particular frequency, and coupled to said second input port of said second summing means for applying said selected portions of said wheel-derived signal thereto, whereby said second summing means produces said coupled attitude position signals in the form of combined coupled attitude position signals.

10. A system according to claim 9, wherein said coupling means further comprises differentiating means coupled to said second summing means, for differentiating said combined coupled attitude position signals for generating said coupled attitude rate signals.

11. A system according to claim 9, wherein said low-pass and high-pass filter means are complementary.

12. A system according to claim 1, wherein:

said attitude determining means comprises attitude estimating means for generating an estimated form of said determined attitude signals.

13. A system according to claim 12, wherein said control means comprises:

a source of attitude position command signals;

first summing means including inverting and noninverting input ports, said noninverting input port being coupled for receiving said attitude position command signals, and said inverting input port being coupled for receiving said coupled attitude position signals for generating attitude error signals; and combining means for summing said attitude error signals with said coupled attitude rate signals for generating said torque command signals.

14. A system according to claim 13, wherein said coupling means comprises:

processing means coupled to said wheel speed sensing means for processing said wheel speed signals by at least integration for causing said wheel-derived signals to represent attitude position.

15. A system according to claim 13, wherein said coupling means further comprises:

second summing means including first and second non-inverting input ports;

low-pass filter means coupled with said attitude determining means and with said first input port of said second summing means for selecting portions of said first form of said determined attitude signals lying below said particular frequency, and for applying said selected portions of said second form of said determined attitude signals to said first input port of said second summing means;

high-pass filter means cascaded with said processing means for selecting portions of said wheel-derived attitude position signal lying above said particular frequency, for applying said selected portions of said wheel-derived attitude position signal to said second input port of said second summing means, whereby said second summing means produces said coupled attitude position signals in the form of combined coupled attitude position signals; and differentiating means coupled to said second summing means and to said combining means for generating said coupled attitude rate signals by differentiating said combined coupled attitude position signals.

16. A system according to claim 15, wherein said high-pass filter means is complementary to said low-pass filter means.

17. A method for controlling the attitude of a spacecraft about a first axis, comprising the steps of:

spinning at least one wheel, said wheel having a wheel axis defining a component parallel to said first axis;

producing speed-representative signals representative of the speed of said wheel;

subtracting coupled attitude position signals from commanded attitude position signals for producing an error signal;

summing signals proportional to said error signal with coupled attitude rate signals proportional to attitude rate to produce torque command signals;

applying said torque command signals to torquing means, which may include said wheel, to torque said spacecraft for tending to maintain said commanded attitude;

determining the attitude of said spacecraft to produce determined attitude position signals;

processing at least one of said attitude position signals and said speed-representative signals to produce therefrom first and second processed signals which both represent one of attitude position and attitude rate;

combining together components of said first processed signals lying below a particular frequency with components of said second processed signals lying above said particular frequency, to produce combined coupled signals;

if said combined coupled signals represent attitude rate, using said combined coupled signals as said coupled attitude rate signals in said summing step; and if said combined coupled signals represent attitude position, using said combined coupled signals as said coupled position signals in said subtracting step.

18. A method according to claim 17, comprising the steps of:

if said combined coupled signals represent attitude rate, integrating said combined coupled signals to produce said coupled attitude position signals for use in said subtracting step; and if said combined coupled signals represent attitude position, differentiating said combined coupled signals to produce said coupled attitude rate signal for use in said summing step.

* * * * *